Figure 1:
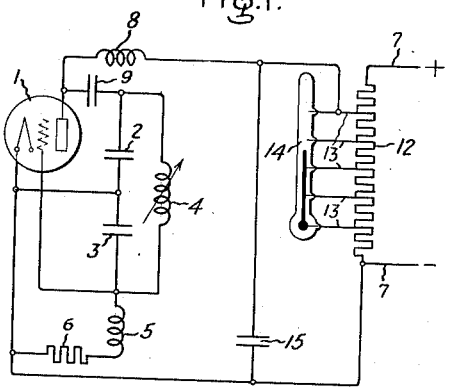

May 16, 1939.    P. D. ANDREWS    2,158,844

TEMPERATURE COMPENSATED OSCILLATOR

Filed Nov. 6, 1936

Inventor:
Paul D. Andrews,
by Harry E. Dunham
His Attorney.

Patented May 16, 1939

2,158,844

UNITED STATES PATENT OFFICE 2,158,844

TEMPERATURE COMPENSATED OSCILLATOR

Paul D. Andrews, Schenectady, N. Y., assignor to General Electric Company, a corporation of New York Application November 6, 1936, Serial No. 109,442

6 Claims. (Cl. 250—36)

My invention relates to oscillation generators having frequency control for maintaining a uniform oscillation frequency notwithstanding changes in temperature. It is the object of my invention to provide an improved oscillation generator of this character whereby compensation for changes in frequency due to temperature changes is effected automatically by a variation in the voltage applied to the generator.

My invention will be better understood from the following description taken in connection with the accompanying drawing, and its scope will be pointed out in the appended claims.

Referring to the drawing, Figs. 1, 2, 3 and 4 are circuit diagrams illustrating various embodiments of my invention.

In Fig 1 I have represented, by way of example an oscillation generator of well known form comprising the grid controlled electron discharge device 1 having the capacitor 2 in its anode-cathode oscillation circuit and the capacitor 3 in its grid-cathode oscillation circuit. These two circuits are coupled together in a well known manner and the capacitors therein are connected with the variable inductance or variometer 4 by which the circuit thereof may be tuned. The grid connects with the cathode through the choke 5 and the grid leak resistor 6. Energy is supplied to the oscillation generator from a suitable source of direct current supply 7 through the choke 8, the blocking capacitor 9 being employed between the anode and the tuned circuit.

In this form of my invention I have provided means for varying the potential applied to the anode-cathode circuit in accordance with the temperature to compensate for changes in frequency of the oscillations due to such temperature changes. Frequency variations of the oscillations may be due to changes in the room or ambient temperature or may be due to heating of parts of the oscillation circuit during the operation of the generator. One form of apparatus which I have provided for varying the voltage applied to the anode-cathode circuit of the generator to compensate for variations in the oscillation frequency thereof comprises the tapped resistor or potentiometer 12 which, as shown in Fig. 1, is connected across the direct current source 7. The potentiometer 12 is provided with a number of taps 13, the lowermost tap being shown connected with the bulb of the contact making thermometer 14. The other taps connect with contacts spaced at intervals up the stem of the thermometer whereby as the column of mercury in the thermometer rises successive sections of the potentiometer are short-circuited. The uppermost tap in this case is shown connected with the anode of the oscillator. A suitable by-pass capacitor 15 is also shown connected across the anode cathode supply circuit.

The operation of this form of my invention will be obvious from an inspection of the drawing. Assuming that the voltage supplied to the anode-cathode circuit by the potentiometer is correct at a certain temperature for the production of a predetermined oscillation frequency, should the temperature of the generator increase due either to a rise in the ambient temperature, or to the operation of the generator, or both, which increase in temperature might cause a slight increase in the oscillation frequency, a corresponding rise in temperature affecting the thermometer 14, which is in thermal association with the oscillation generator, would cause one or more additional sections of the potentiometer to become short-circuited and thus reduce the voltage applied to the anode-cathode circuit of the generator. Likewise, fith a decrease in temperature the voltage applied to the generator is accordingly increased to offset a decrease in frequency due to a lowering of the temperature.

Figure 2:
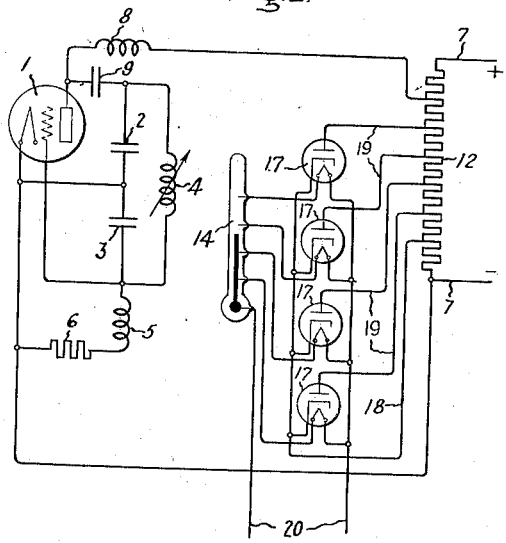

It will be noted that in the above-described apparatus the changes in the voltage applied to the generator occur in definite steps. In certain cases I may prefer to have the changes in applied voltage less abrupt than that which obtains in Fig. 1. In Fig. 2, therefore, I have shown a modified form of my invention whereby the changes in voltage applied to the generator occur in steps as before but the steps are more gradual. In this figure the oscillation generator is the same as that shown in Fig. 1. Instead of the taps of the potentiometer connecting directly with the terminals of the thermometer I employ a plurality of electron discharge devices 17 to connect the taps of the potentiometer for successively short-circuiting the sections thereof. The operation of these discharge devices 17 is controled by the heating of their respective cathodes which in turn is controlled by the height of the mercury column in the thermometer 14. As shown in Fig. 2 the lowermost tap 18 connects with all of the cathodes of the devices 17 and the remaining taps 19 connect individually with the anodes of devices 17. The heater of each cathode has one side connected to the source 20 of heater current and the other side connected with the terminals in the stem of the thermometer, the other side of the source being connected with the bulb of the thermometer.

In this form of my invention with the mercury in the thermometer at the height shown, the two lowermost devices 17 will have their cathodes heated and will thus short-circuit those portions of the potentiometer included between the three lowermost taps thereof. If the temperature increases the consequent rise of the mercury in the thermometer will close the heater circuit of the next higher device 17 whereupon the next higher section of the potentiometer will become short-circuited. However, this short-circuiting action will not take place suddenly but only after a predetermined time delay which, for example, may be from 5 to 30 seconds depending upon the character of the devices 17 employed. Thus the decrease in voltage applied to the generator is gradual. Likewise, when the temperature decreases enough to open the circuit of the heater of one of the devices 17 the resulting change in voltage applied to the generator is gradual due to the cooling of the heater.

Figure 3:
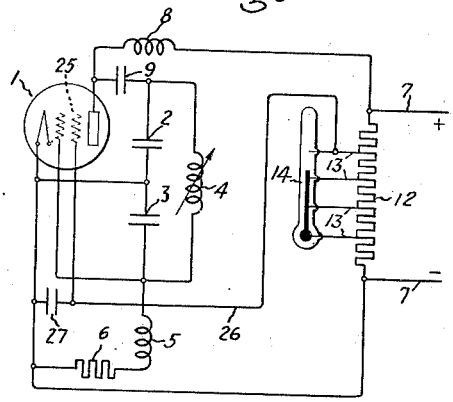

In that form of my invention comprising Fig. 3 I have shown the temperature responsive means arranged to vary the potential applied to the screen grid of the discharge device employed in the oscillation generator. In this case the generator is similar to that shown in the two previous figures except that the electron discharge device 1 is provided with the screen grid 25 which connects through the wire 26 with the uppermost tap of the potentiometer and also connects with the cathode through the blocking capacitor 27. In this case also the anode connects directly with one end of the potentiometer.

In the operation of this form of my invention an increase in temperature causes one or more sections of the potentiometer to become short-circuited under the control of the thermometer 14 which results in a decrease in the voltage applied to the screen grid 25, the voltage applied to the anode-cathode circuit being unchanged. The change in screen grid voltage serves to compensate for changes in frequency of the oscillation generator due to the temperature changes.

Figure 4:
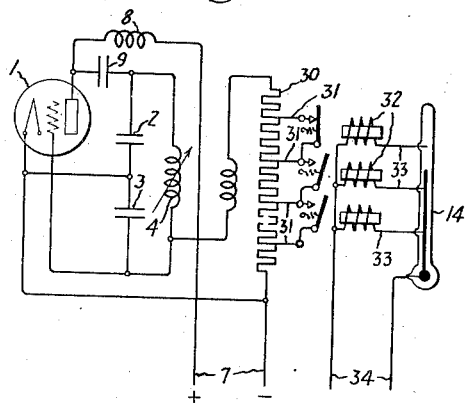

In that form of my invention shown by Fig. 4 I compensate for variations in oscillation frequency due to temperature changes by automatically varying the resistance of the grid leak resistor. The oscillation generator in this case is like that shown in Fig. 1 but the grid leak resistor now is in the form of the potentiometer 30 which is provided with the taps 31. I have provided temperature responsive means for short-circuiting sections of the potentiometer 30 between the taps 31 thereby to vary the resistance of the grid leak resistor. The means which I have shown for this purpose are the several relays 32 whose armature circuits connect through back contacts with the taps 31 and whose windings connect with the terminals 33 in the stem of the thermometer 14. A suitable source 34 of current supply connects at one side with the relay windings and at the other side with the bulb of the thermometer.

With this form of my invention as the temperature increases and the mercury moves up the tube of the thermometer, one or more of the relays 32 become energized to withdraw their armatures from positions normally short-circuiting sections of the potentiometer 30, thus including a greater portion or portions of the potentiometer 30 in the grid leak circuit. This will have the effect of compensating for the otherwise increase in oscillation frequency due to the rise in temperature. Likewise as the temperature decreases successive sections of the potentiometer 30 are short-circuited to decrease the resistance in the grid leak circuit.

In the above description the several oscillation circuits have been considered as having the same frequency characteristic, namely, a decrease in the applied electrode voltage due to an increase in the temperature would be accompanied by a decrease in the oscillation frequency. All types of oscillation circuits, however, do not have the same frequency characteristic for in some a decrease in the applied voltage produces an increase in the oscillation frequency. By a simple and obvious change in the compensating arrangement of each of the forms of my invention illustrated by Figs. 1, 2 and 3 they may be made to increase the applied voltage instead of decreasing it with an increase in temperature. Likewise, in the case of that form illustrated by Fig. 4 the resistance of the grid leak resistor may be made to decrease with an increase in temperature. Thus my invention is applicable to the compensation of the various type of vacuum tube oscillation circuits.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. In combination, an oscillation generator including an electron discharge device, a source of current supply for said generator, a potentiometer for varying the voltage supplied to said device from said source and a temperature responsive device for controlling the setting of said potentiometer.

2. In combination, an oscillation generator including an electron discharge device, a source of current supply for said generator, a potentiometer connected across said source and connected with said device, and means including a contact making thermometer for short-circuiting portions of said potentiometer.

3. In combination, an oscillation generator including an electron discharge device having an anode-cathode circuit, a source of current supply for said generator, means including a plurality of electron discharge devices having cathode heaters for varying the voltage applied to said anode-cathode circuit from said source and temperature responsive means for controlling the heating of said heaters.

4. In combination, an oscillation generator including an electron discharge device, a source of current supply, a resistor connected across said source, and temperature responsive means for supplying to said device the voltage across a variable portion of said resistor.

5. In combination, an oscillation generator including an electron discharge device, a supply circuit including a source of current and a resistor having a plurality of sections connected across said source, means for supplying voltage to said device from said resistor, and a temperature responsive device for controlling the number of sections of said resistor from which voltage is taken for said device.

6. In combination, an oscillation generator including an electron discharge device, a source of current supply, a resistor having a plurality of taps connected across said source, means for supplying the voltage across a portion of said resistor to said device and a liquid thermometer provided with a plurality of spaced contacts each connected with one of said taps.

PAUL D. ANDREWS.